United States Patent
Ji et al.

(10) Patent No.: US 12,486,224 B2
(45) Date of Patent: Dec. 2, 2025

(54) POLYSUBSTITUTED SELENIUM-CONTAINING CYCLOPENT(HEX)ENE SKELETON DERIVATIVE AND SYNTHESIS METHOD THEREOF

(71) Applicant: SOOCHOW UNIVERSITY, Suzhou (CN)

(72) Inventors: Shunjun Ji, Suzhou (CN); Zhongjian Cai, Suzhou (CN); Dianliang Wang, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 96 days.

(21) Appl. No.: 17/910,859

(22) PCT Filed: Jul. 16, 2021

(86) PCT No.: PCT/CN2021/106687
§ 371 (c)(1),
(2) Date: Sep. 12, 2022

(87) PCT Pub. No.: WO2023/279426
PCT Pub. Date: Jan. 12, 2023

(65) Prior Publication Data
US 2024/0228436 A1 Jul. 11, 2024

(30) Foreign Application Priority Data

Jul. 6, 2021 (CN) .......................... 202110764081.2

(51) Int. Cl.
C07C 391/02 (2006.01)
C07C 391/00 (2006.01)

(52) U.S. Cl.
CPC .......... *C07C 391/02* (2013.01); *C07C 391/00* (2013.01)

(58) Field of Classification Search
None
See application file for complete search history.

(56) References Cited

U.S. PATENT DOCUMENTS

2023/0219886 A1* 7/2023 Sharma ................. C07C 391/00
514/419

OTHER PUBLICATIONS

Mark E. Welker, "3+2 Cycloaddition Reactions of Transition-Metal 2-Alkynyl and n'-Ailyl Complexes and Their Utilization in Five-Membered-Ring Compound Syntheses" chem. Rev. 1992, 92, 97-112 (Dec. 31, 1992).
Yuzhen Gao et al., "Copper-Catalyzed Cascade Radical Addition-Cyclization Halogen Atom Transfer between Alkynes and Unsaturated α-Halogenocarbonyls" ACS Catal. 2017, 7, 186-190 (Nov. 29, 2016).
Claudio C. Silveira et al., "Reaction of ethyl alpha-alpha-phenylselenoacetate with alkenes: synthesis of alpha-phenylseleno-gamma-butyrolactones" Synthesis, vol. 10, pp. 1305-1310 (Oct. 31, 1995).
Jie-Jie Liu et al., "Visible-Light-Mediated Stereoselective 1,2-Iodoalkylation of Alkynes" Advanced Synthesis & Catalysis, vol. 361, pp. 1283-1288 (Feb. 12, 2019).

* cited by examiner

*Primary Examiner* — Amy C Bonaparte
(74) *Attorney, Agent, or Firm* — SZDC Law PC

(57) ABSTRACT

The present invention provides a polysubstituted selenium-containing cyclopent(hex)ene skeleton derivative and a synthesis method thereof. The polysubstituted selenium-containing cyclopent(hex)ene skeleton derivative is prepared by a one-pot method using an arylacetylene compound and an unsaturated selenide reagent as reaction materials, in the presence of a free radical initiator. The synthesis method of the present invention is simple and efficient, requires no metal catalyst, has mild reaction conditions, and has good functional group tolerance and broad substrate scope. Moreover, cyclopent(hex)ene compounds with different substituents are widely present in active drug molecules, and selenium-containing compounds also have good biological activity against tumors, oxidation, inflammation, bacteria, viruses and others. Therefore, a complex selenide-containing cyclopent(hex)ene skeleton derivative is obtained starting from a simple substrate by the synthesis method of the present invention by constructing a C—Se bond through a simple, efficient and sustainable strategy. The present invention has broad application prospects.

10 Claims, No Drawings

POLYSUBSTITUTED SELENIUM-CONTAINING CYCLOPENT(HEX)ENE SKELETON DERIVATIVE AND SYNTHESIS METHOD THEREOF

This application is the National Stage Application of PCT/CN2021/106687, filed on Jul. 16, 2021, which claims priority to Chinese Patent Application No. 202110764081.2, filed on Jul. 6, 2021, which is incorporated by reference for all purposes as if fully set forth herein.

FIELD OF THE INVENTION

The present invention relates to the technical field of organic synthesis, and in particular, to a polysubstituted selenium-containing cyclopent(hex)ene skeleton derivative and a synthesis method thereof.

DESCRIPTION OF THE RELATED ART

Cyclopent(hex)ene is a very important organic molecular skeleton, and cyclopent(hex)ene compounds with different substituents are widely found in natural products and pharmacologically active molecules. For example, studies have shown that 1,2-diarylcyclopentene compounds SC-57666 and SC-58231, an excellent class of highly selective cyclooxygenase-2 (COX-2) inhibitors; cyclopentenol Abacavir, a commercialized anti-AIDS adjunctive drug; and the analgesic and narcotic Morphin and vitamin A all contain cyclohexene skeletons.

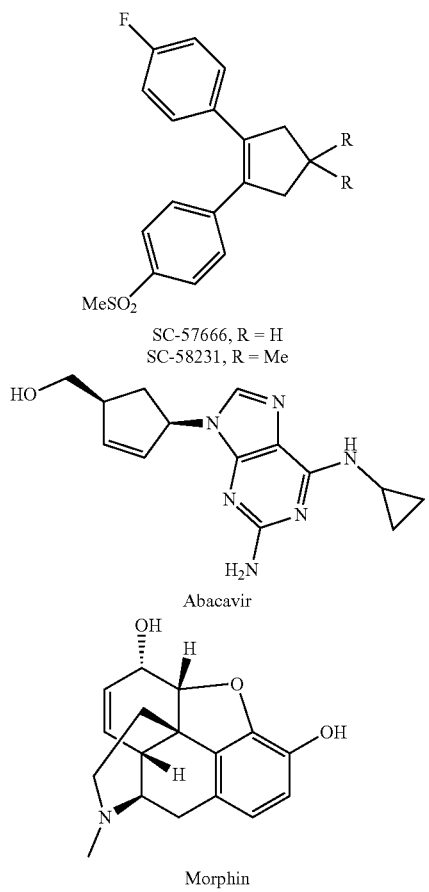

SC-57666, R = H
SC-58231, R = Me

Abacavir

Morphin

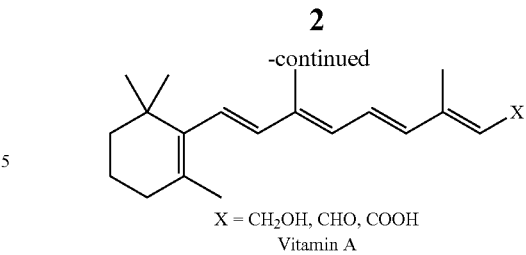

X = CH$_2$OH, CHO, COOH
Vitamin A

Moreover, selenium-containing compounds have received more and more attention, due to their potential biological, pharmaceutical and material characteristics. Some selenium-containing compounds are confirmed to have good biological activity against tumors, oxidation, inflammation, bacteria, viruses and others. For example, selenocysteine is currently considered to be the 21st standard amino acid, and an indispensable element in living organisms. Ebselen, as a novel anti-inflammatory drug, is clinically used to treat rheumatoid arthritis, osteoarthritis and other diseases. Ethaselen shows significant antitumor activity.

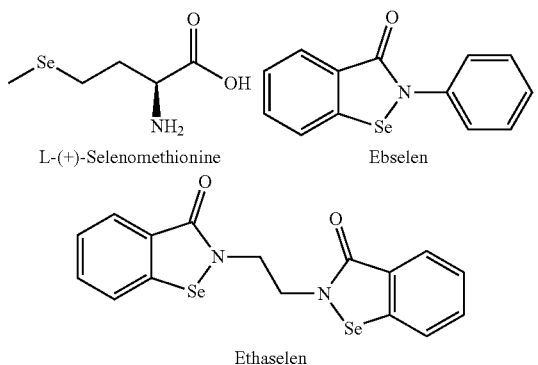

L-(+)-Selenomethionine

Ebselen

Ethaselen

Accordingly, it is of great significance to develop an efficient and convenient method for synthesizing a polysubstituted selenium-containing cyclopent(hex)ene skeleton derivative.

SUMMARY OF THE INVENTION

The present invention provides a polysubstituted selenium-containing cyclopent(hex)ene skeleton derivative and a synthesis method thereof. The polysubstituted selenium-containing cyclopent(hex)ene skeleton derivative is synthesized in one step in the presence of a free-radical initiator. The method has mild reaction conditions, simple and safe operations, and high atomic economy. The selenium-containing cyclopent(hex)ene skeleton derivative has potential applications in chemical/pharmaceutical industries.

To solve the above technical problems, the present invention provides the following technical solutions.

In a first aspect of the present invention, a polysubstituted selenium-containing cyclopent(hex)ene skeleton derivative is provided, which has a structural formula shown below:

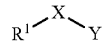

wherein X is selected from phenyl, naphthyl or heteroaryl;

$R^1$ is selected from hydrogen, C1-C4 alkyl, C1-C4 alkoxy, halo, amino, cyano, trifluoromethyl or nitro;

Y is selected from Formulas 1 to 6:

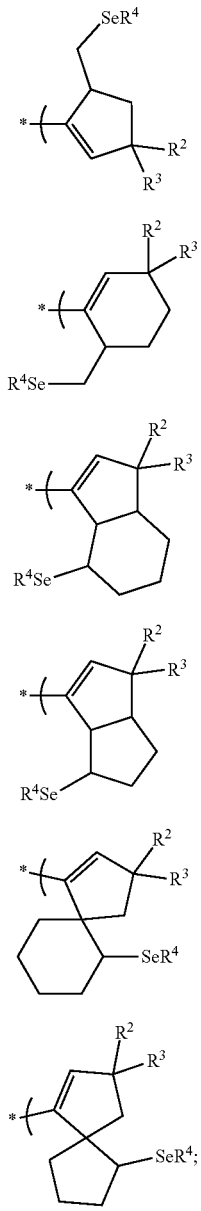

$R^2$ is selected from a methyl formate ester group, a ethyl formate ester group or cyano; and $R^3$ is selected from a methyl formate ester group, a ethyl formate ester group or cyano; and $R^4$ is selected from phenyl, a substituted phenyl, or C1-C2 alkyl.

In a second aspect of the present invention, a method for synthesizing the polysubstituted selenium-containing cyclopent(hex)ene skeleton derivative according to the first aspect is provided, which comprises the following steps:

(1) under a protective atmosphere, adding an arylacetylene compound, an unsaturated selenide reagent and a free-radical initiator to an organic solvent, and stirring for reaction;

(2) after the reaction is completed, concentrating the reaction solution under vacuum and separating by column chromatography to obtain the polysubstituted selenium-containing cyclopent(hex)ene skeleton derivative.

The reaction formula is shown below:

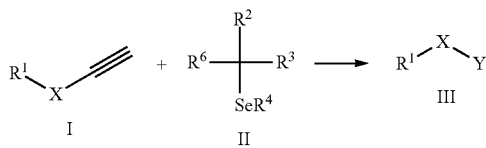

where $R^5$ is selected from propenyl, butenyl, 2-cyclohexenyl, 2-cyclopentenyl, 1-methyl-1-cyclohexenyl or 1-methyl-1-cyclopentenyl.

Preferably, the protective gas is argon, oxygen or air.

Preferably, the arylacetylene compound is selected from phenylacetylene (1), 2-fluorophenylacetylene (2), 3-fluorophenylacetylene (3), 4-fluorophenylacetylene (4), 3-chlorophenylacetylene (5), 4-chlorophenylacetylene (6), 3-bromophenylacetylene (7), 4-bromophenylacetylene (8), 4-methylphenylacetylene (9), 4-methoxyphenylacetylene (10), 3-aminophenylacetylene (11), 4-nitrophenylacetylene (12), 4-nitrilphenylacetylene (13), 4-trifluoromethylphenylacetylene (14), 3-pyridylacetylene (15), 2-pyridylacetylene (16), 3-thiophenylacetylene (17), 2-thiophenylacetylene (18) or naphthylacetylene (19). The specific structural formulas corresponding to the above numbers are shown below:

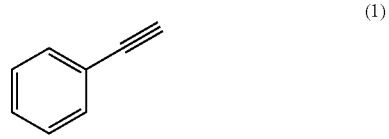

(1)

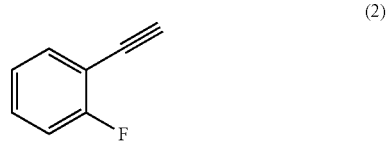

(2)

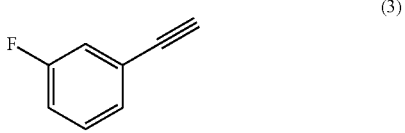

(3)

(4)

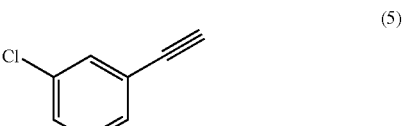

(5)

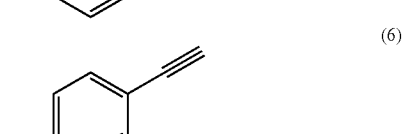

(6)

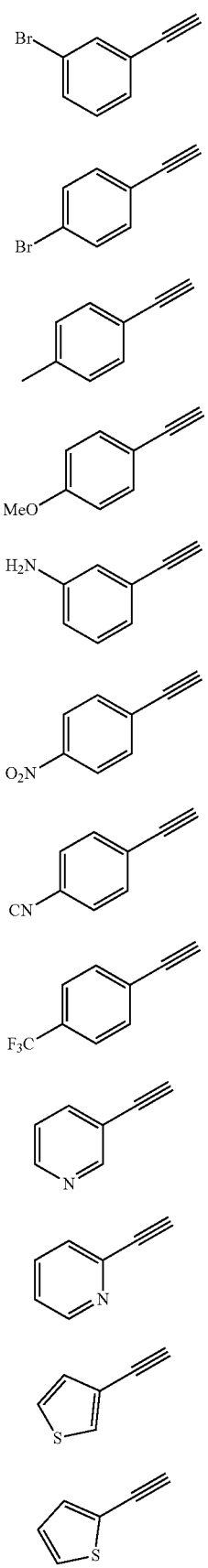

(7)

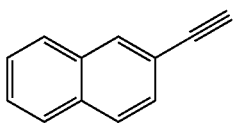
(19)

Preferably, the unsaturated selenide reagent is selected from dimethyl 2-allyl-2-(phenylselenyl)malonate (20), diethyl 2-allyl-2-(phenylselenyl)malonate (21), ethyl 2-methyl-2-(phenylselenyl)pent-4-enoate (22), 2-allyl-2-(phenylselenyl)malononitrile (23), ethyl 2-cyano-2-(phenylselenyl)pent-4-enoate (24), 2-allyl-2-(methylselenyl)dimethyl malonate (25), 2-allyl-2-(ethylselenyl)dimethyl malonate (26), 2-allyl-2-(4-methoxyphenylselenyl)dimethyl malonate (27), 2-allyl-2-(2-methoxyphenylselenyl)dimethyl malonate (28), 2-allyl-2-(4-(methyl formate ester group) phenylselenyl)dimethyl malonate (29), 2-allylmethyl-2-(phenylselenyl)dimethyl malonate (30), 2-(cyclohex-2-en-1-yl)-2-(phenylselenyl)dimethyl malonate (31), 2-(cyclopent-2-en-1-yl)-2-(phenylselenyl)dimethyl malonate (32), 2-(cyclohex-1-en-1-ylmethyl)-2-(phenylselenyl)dimethyl malonate(33) or 2-(cyclopent-1-en-1-ylmethyl)-2-(phenylselenyl)dimethyl malonate (34). The specific structural formulas corresponding to the above numbers are shown below:

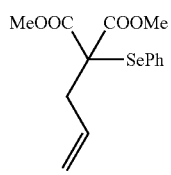
(20)

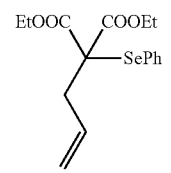
(21)

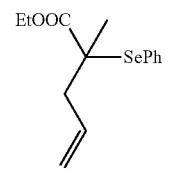
(22)

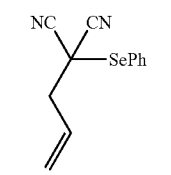
(23)

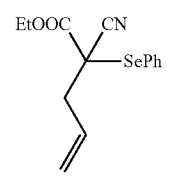
(24)

-continued

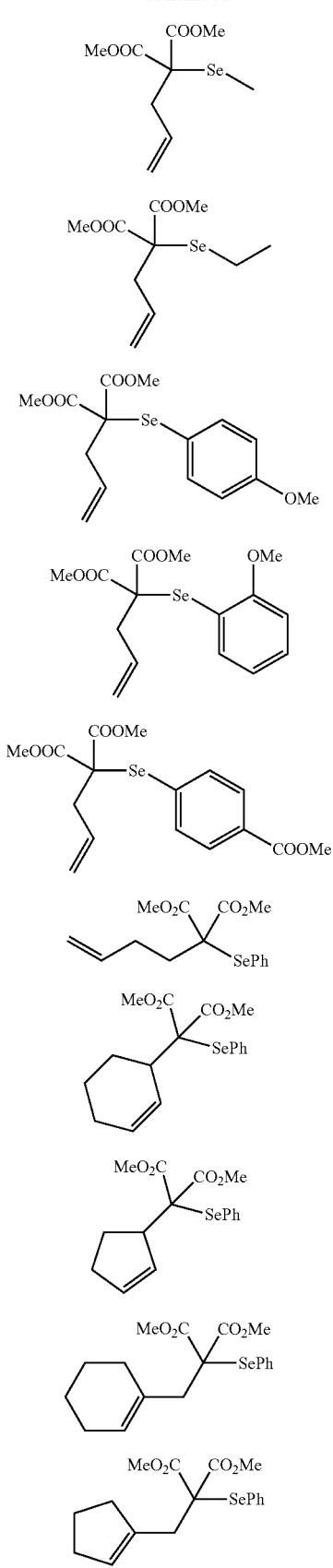

(25)
(26)
(27)
(28)
(29)
(30)
(31)
(32)
(33)
(34)

Preferably, the free-radical initiator is selected from the group consisting of azodiisobutyronitrile, azo-bis-iso-heptonitrile, dimethyl 2,2'-azobis(2-methylpropionate), N-iodosuccinimide, N-bromosuccinimide, benzoyl peroxide, and tert-butyl hydroperoxide.

Preferably, the free-radical initiator is azodiisobutyronitrile.

Preferably, in Step (1), the molar ratio of the arylacetylene compound to the unsaturated selenide reagent is 1:3 to 3:1.

Preferably, in Step (1), the molar ratio of the arylacetylene compound to the free-radical initiator is 1:0.1 to 1:2.

Preferably, in Step (1), the organic solvent is selected from the group consisting of ethyl acetate, dimethyl sulfoxide, N,N-dimethylformamide, N,N-dimethylacetamide, 1,4-dioxane, acetonitrile and any combination thereof.

Preferably, in Step (1), the reaction temperature is 20 to 150° C.

Preferably, in Step (1), the reaction temperature is 2 to 12 h.

Preferably, Column chromatography conditions: stationary phase: 200-300 mesh silica gel powder, mobile phases: ethyl acetate (A) and petroleum ether (B), Mobile phase gradient procedure: ethyl acetate/petroleum ether in volume ratio: 1:20.

Preferably, the reaction product has a structural formula selected from numbers (35) to (67):

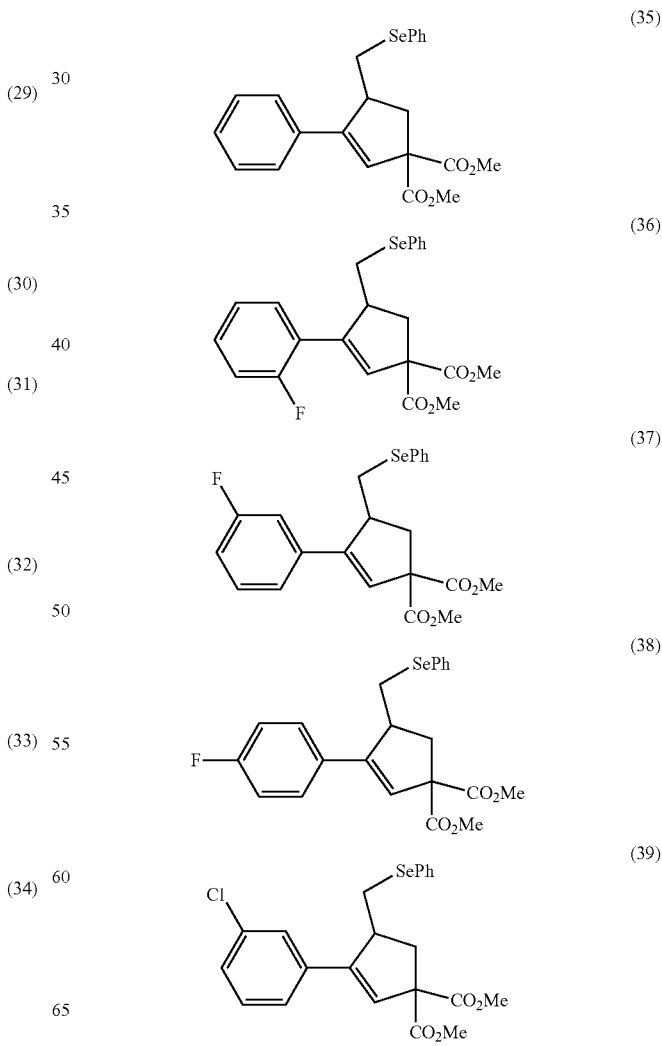

-continued
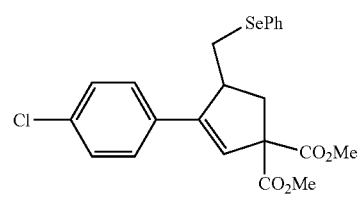
(40)
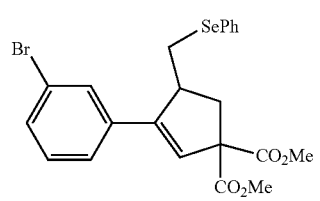
(41)
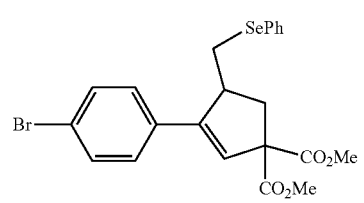
(42)
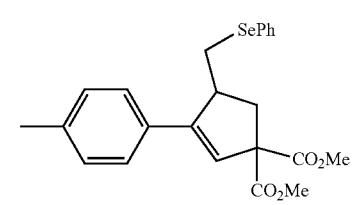
(43)
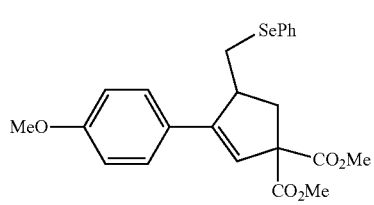
(44)
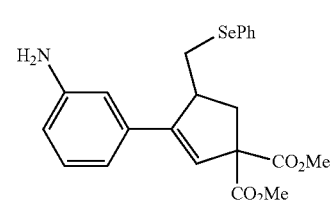
(45)
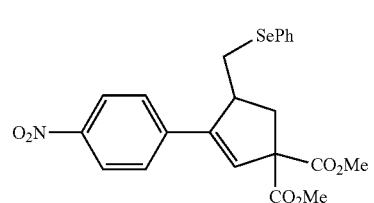
(46)
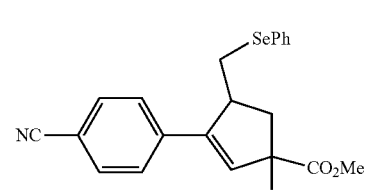
(47)
-continued
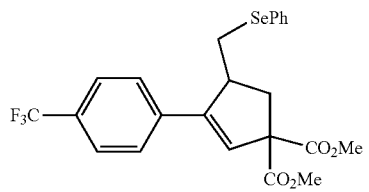
(48)
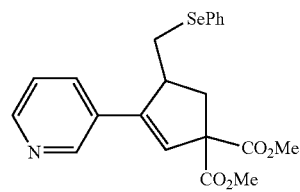
(49)
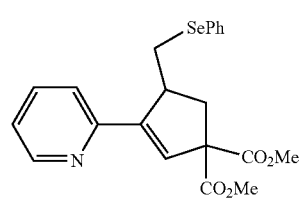
(50)
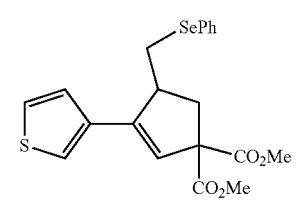
(51)
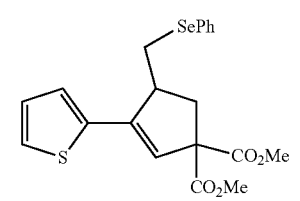
(52)
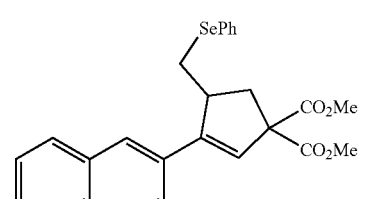
(53)
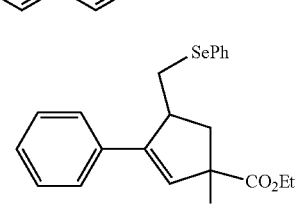
(54)
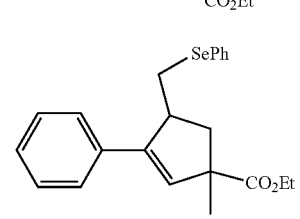
(55)

-continued
(56) 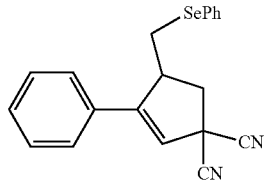
(57) 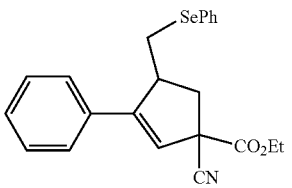
(58) 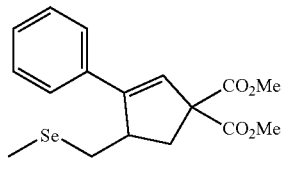
(59) 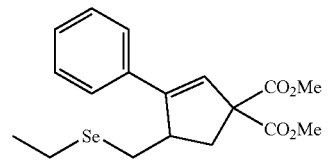
(60) 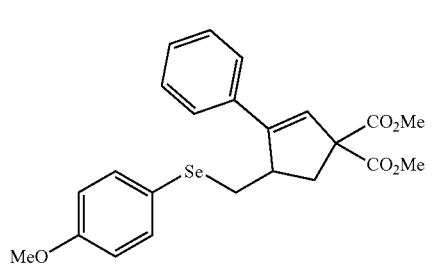
(61) 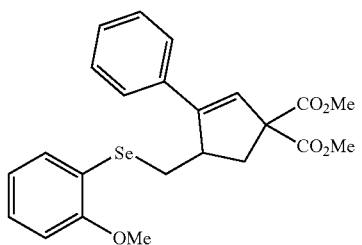
(62) 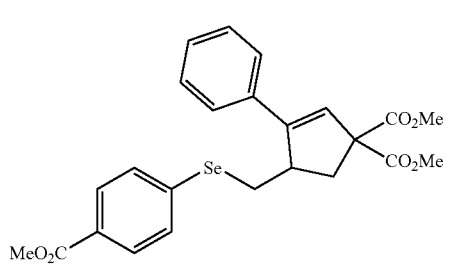
-continued
(63) 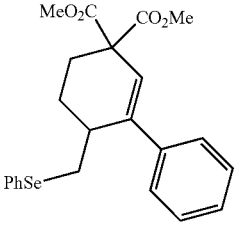
(64) 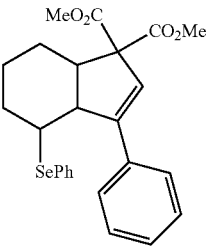
(65) 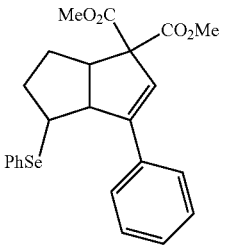
(66) 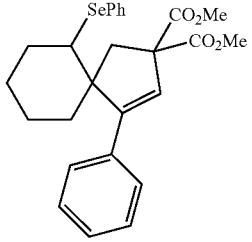
(67) 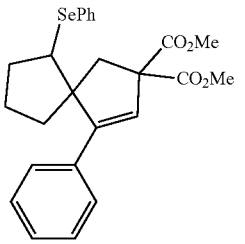
The reaction principle of the present invention is described by way of example where phenylacetylene, and dimethyl 2-allyl-2-(phenylselenyl)malonate are reacted to produce dimethyl 3-phenyl-4-((phenylselenyl)methyl)cyclopent-2-ene-1,1-carboxylate in the presence of azodiisobutyronitrile (AIBN). The reaction scheme is specifically shown below:

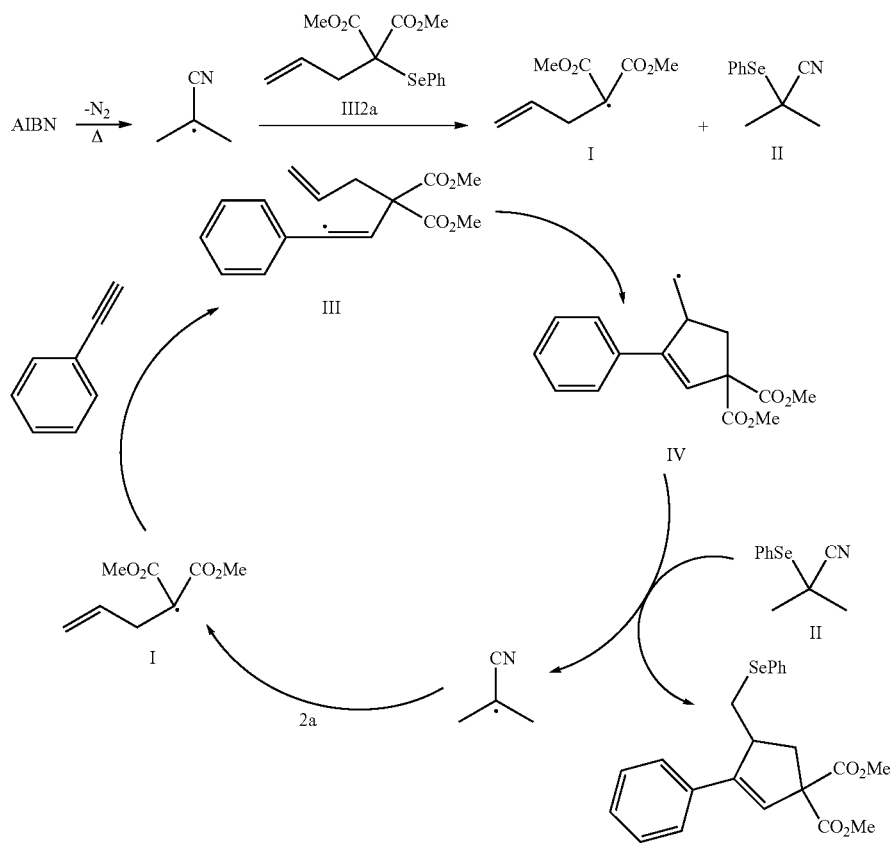

The method mainly comprises the following procedures.
(1) By heating under a protective atmosphere, isobutyronitrile radicals generated by denitrogenation of AIBN attack dimethyl 2-allyl-2-(phenylselenyl) malonate to generate a radical I and an intermediate II.
(2) The radical I obtained in the procedure (1) attacks phenylacetylene to obtain a radical intermediate III.
(3) The radical intermediate III undergoes intramolecular addition cyclization to obtain a radical intermediate IV.
(4) The radical intermediate IV undergoes free radical exchange with the intermediate II to obtain the final product dimethyl 3-phenyl-4-((phenylselenyl)methyl) cyclopent-2-ene-1,1-dicarboxylate, and isobutyronitrile radicals are regenerated at the same time, to complete the cycle.

By virtue of the above solutions, the present invention has at least the following advantages.
1. In the present invention, radical cyclization of alkynes is applied to the synthesis of selenium-functionalized products by C—Se bond cleavage/alkyne insertion, which breaks through the limitations of traditional reactions.
2. In the present invention, a polysubstituted selenium-containing cyclopentene skeleton derivative is prepared by a one-pot method using an arylacetylene compound, and an unsaturated selenide reagent as reaction materials, in the presence of a free radical initiator. The preparation reparation method is simple, and easy to operate, and requires no metal catalyst. The method has mild reaction conditions, and high atomic economy.
3. In method for synthesizing a polysubstituted selenium-containing cyclopent(hex)ene skeleton derivative according to the present invention, the four groups connected to the central carbon atom of the reaction substrate can be replaced modularly without affecting the occurrence of the reaction. This fully demonstrate that the synthesis method has good functional group tolerance and broad substrate scope.
4. The polysubstituted selenium-containing cyclopent (hex)ene skeleton derivative provided in the present invention has potential applications in the chemical/pharmaceutical industry.

DETAILED DESCRIPTION OF THE PREFERRED EMBODIMENTS

The present invention will be further described below in connection with specific examples, so that those skilled in the art can better understand and implement the present invention; however, the present invention is not limited thereto.

Unless otherwise defined, all technical and scientific terms used herein have the same meaning as commonly understood by persons skilled in the art to which the present invention pertains. The terms used in the descriptions of the present invention are for the purpose of describing specific embodiments only and are not intended to limit the present invention. The term "and/or" as used herein includes any and all combinations of one or more of the listed related items.

Unless otherwise stated, the experimental methods given in examples below are all conventional methods. The materials, and reagents involved in the examples are commercially available, unless otherwise specified.

Example 1: Synthesis of dimethyl 3-phenyl-4-((phenylselenyl)methyl)cyclopent-2-ene-1,1-dicarboxylate (35)

Under an inert atmosphere, 0.0204 g of phenylacetylene, 0.1308 g of dimethyl 2-allyl-2-phenylselenylmalonate, and 0.0097 g of azodiisobutyronitrile were dissolved in 2.0 mL of ethyl acetate, and stirred at 80° ° C. for 10 h. After the reaction, the reaction solution was concentrated under vacuum and then separated by column chromatography (column chromatography conditions: stationary phase: 200-300 mesh silica gel powder, mobile phases: ethyl acetate (A) and petroleum ether (B), and mobile phase gradient procedure: A/B in volume ratio: 1:20), to obtain 0.0682 g of a reaction product.

The reaction product was characterized. $^1$H NMR (400 MHZ, deuterated chloroform) δ 7.51-7.48 (m, 2H), 7.28-7.23 (m, 8H), 6.11 (d, J=4.0 Hz, 1H), 3.76 (s, 3H), 3.72 (s, 3H), 3.57-3.51 (m, 1H), 3.24-3.20 (m, 1H), 2.91-2.85 (m, 1H), 2.74-2.69 (m, 1H), 2.65-2.60 (m, 1H) ppm. According to the characterization data, it can be seen that the obtained reaction product is pure dimethyl 3-phenyl-4-((phenylselenyl) methyl) cyclopent-2-ene-1,1-dicarboxylate (purity>95%). The yield of the product is calculated to be 79%.

Example 2: Synthesis of dimethyl 3-(2-fluorophenyl)-4-((phenylselenyl) methyl) cyclopent-2-ene-1,1-dicarboxylate (36)

Under an inert atmosphere, 0.0240 g of 2-fluorophenylacetylene, 0.1308 g of dimethyl 2-allyl-2-phenylselenylmalonate, and 0.0097 g of azodiisobutyronitrile were dissolved in 2.0 mL of ethyl acetate, and stirred at 80° ° C. for 10 h. After the reaction, the reaction solution was concentrated under vacuum and then separated by column chromatography (column chromatography conditions: stationary phase: 200-300 mesh silica gel powder, mobile phases: ethyl acetate (A) and petroleum ether (B), and mobile phase gradient procedure: A/B in volume ratio: 1:20), to obtain 0.0800 g of a reaction product.

The reaction product was characterized. $^1$H NMR (400 MHZ, deuterated chloroform) δ 7.48-7.45 (m, 2H), 7.27-7.22 (m, 4H), 7.17-7.13 (m, 1H), 7.07-7.01 (m, 2H), 6.22 (s, 1H), 3.78 (s, 3H), 3.73 (s, 3H), 3.68-3.62 (m, 1H), 3.18-3.14 (m, 1H), 2.92-2.86 (m, 1H), 2.74-2.68 (m, 1H), 2.55-2.50 (m, 1H) ppm. According to the characterization data, it can be seen that the obtained reaction product is pure dimethyl 3-(2-fluorophenyl)-4-((phenylselenyl) methyl) cyclopent-2-ene-1,1-dicarboxylate (purity>95%). The yield of the product is calculated to be 89%.

Example 3: Synthesis of dimethyl 3-(3-bromophenyl)-4-((phenylselenyl) methyl) cyclopent-2-ene-1,1-dicarboxylate (41)

Under an inert atmosphere, 0.0361 g of 3-bromophenylacetylene, 0.1308 g of dimethyl 2-allyl-2-phenylselenylmalonate, and 0.0097 g of azodiisobutyronitrile were dissolved in 2.0 mL of ethyl acetate, and stirred at 80° C. for 10 h. After the reaction, the reaction solution was concentrated under vacuum and then separated by column chromatography (column chromatography conditions: stationary phase: 200-300 mesh silica gel powder, mobile phases: ethyl acetate (A) and petroleum ether (B), and mobile phase gradient procedure: A/B in volume ratio: 1:20), to obtain 0.0590 g of a reaction product.

The reaction product was characterized. $^1$H NMR (400 MHZ, deuterated chloroform) δ 7.51-7.48 (m, 2H), 7.40-7.37 (m, 2H), 7.29-7.26 (m, 3H), 7.15-7.13 (m, 2H), 6.13, (m, 1H), 3.78 (s, 3H), 3.73 (s, 3H), 3.50-3.43 (m, 1H), 3.19-3.15 (m, 1H), 2.90-2.84 (m, 1H), 2.72-2.69 (m, 1H), 2.67-2.61 (m, 1H) ppm. According to the characterization data, it can be seen that the obtained reaction product is pure dimethyl 3-(3-bromophenyl)-4-((phenylselenyl) methyl) cyclopent-2-ene-1,1-dicarboxylate (purity>95%). The yield of the product is calculated to be 58%.

Example 4: Synthesis of dimethyl 3-(3-aminophenyl)-4-((phenylselenyl) methyl) cyclopent-2-ene-1,1-dicarboxylate (45)

Under an inert atmosphere, 0.0234 g of 3-aminophenylacetylene, 0.1308 g of dimethyl 2-allyl-2-phenylselenylmalonate and 0.0097 g of azodiisobutyronitrile were dissolved in 2.0 mL of ethyl acetate, and stirred at 80° C. for 10 h. After the reaction, the reaction solution was concentrated under vacuum and then separated by column chromatography (column chromatography conditions: stationary phase: 200-300 mesh silica gel powder, mobile phases: ethyl acetate (A) and petroleum ether (B), and mobile phase gradient procedure: A/B in volume ratio: 1:20), to obtain 0.0544 g of a reaction product.

The reaction product was characterized. $^1$H NMR (400 MHZ, deuterated chloroform) δ 7.53-7.51 (m, 2H), 7.27-7.25 (m, 3H), 7.08-7.04 (m, 1H), 6.67-6.64 (m, 1H), 6.59-6.57 (m, 1H), 6.48-6.47 (m, 1H), 6.06 (s, 1H), 3.76 (s, 3H), 3.71 (s, 3H), 3.51-3.44 (m, 1H), 3.24-3.21 (m, 1H), 2.89-2.84 (m, 1H), 2.72-2.67 (m, 1H), 2.61-2.57 (m, 1H) ppm. According to the characterization data, it can be seen that the obtained reaction product is pure dimethyl 3-(3-aminophenyl)-4-((phenylselenyl) methyl) cyclopent-2-ene-1,1-dicarboxylate (purity>95%). The yield of the product is calculated to be 62%.

Example 5: Synthesis of dimethyl 3-methyl-4-((phenylselenyl) methyl) cyclopent-2-ene-1,1-dicarboxylate (58)

Under an inert atmosphere, 0.0204 g of phenylacetylene, 0.1060 g of dimethyl 2-allyl-2-(methylselenyl)malonate and 0.0097 g of azodiisobutyronitrile were dissolved in 2.0 mL of ethyl acetate, and stirred at 80° C. for 10 h. After the reaction, the reaction solution was concentrated under vacuum and then separated by column chromatography (column chromatography conditions: stationary phase: 200-300 mesh silica gel powder, mobile phases: ethyl acetate (A) and petroleum ether (B), and mobile phase gradient procedure: A/B in volume ratio: 1:20), to obtain 0.0545 g of a reaction product.

The reaction product was characterized. $^1$H NMR (400 MHZ, deuterated chloroform) δ 7.41-7.39 (m, 2H), 7.37-7.33 (m, 2H), 7.31-7.27 (m, 1H), 6.12 (s, 1H), 3.78 (s, 3H), 3.73 (s, 3H), 3.64-3.59 (m, 1H), 2.94-2.85 (m, 2H), 2.59-2.54 (m, 1H), 2.47-2.42 (m, 1H), 1.97 (s, 3H) ppm. According to the characterization data, it can be seen that the obtained reaction product is pure dimethyl 3-methyl-4-((phenylselenyl) methyl) cyclopent-2-ene-1,1-dicarboxylate (purity>95%). The yield of the product is calculated to be 69%.

Example 6: Synthesis of diethyl 3-phenyl-4-((2-methoxyphenylselenyl) methyl) cyclopent-2-ene-1,1-dicarboxylate (61)

Under an inert atmosphere, 0.0204 g of phenylacetylene, 0.1429 g of dimethyl 2-allyl-2-(2-methoxyphenylselenyl) malonate and 0.0097 g of azodiisobutyronitrile were dissolved in 2.0 mL of ethyl acetate, and stirred at 80° C. for 10 h. After the reaction, the reaction solution was concentrated under vacuum and then separated by column chromatography (column chromatography conditions: stationary phase: 200-300 mesh silica gel powder, mobile phases: ethyl acetate (A) and petroleum ether (B), and mobile phase gradient procedure: A/B in volume ratio: 1:20), to obtain 0.0585 g of a reaction product.

The reaction product was characterized. $^1$H NMR (400 MHz, deuterated chloroform) δ 7.42-7.21 (m, 7H), 6.88-6.82 (m, 2H), 6.12 (s, 1H), 4.27-4.13 (m, 4H), 3.84 (s, 3H), 3.56-3.50 (m, 1H), 3.35-3.22 (m, 1H), 2.90-2.84 (m, 1H), 2.72-2.61 (m, 2H), 1.29-1.22 (m, 6H) ppm. According to the characterization data, it can be seen that the obtained reaction product is pure diethyl 3-phenyl-4-((2-methoxyphenylselenyl) methyl) cyclopent-2-ene-1,1-dicarboxylate (purity>95%). The yield of the product is calculated to be 60%.

Example 7: Synthesis of dimethyl 3-phenyl-4-((phenylselenyl) methyl) cyclohex-2-ene-1,1-dicarboxylate (63)

Under an inert atmosphere, 0.0204 g of phenylacetylene, 0.1365 g of dimethyl 2-allylmethyl-2-(phenylselenyl)malonate and 0.0097 g of azodiisobutyronitrile were dissolved in 2.0 mL of ethyl acetate, and stirred at 80° C. for 10 h. After the reaction, the reaction solution was concentrated under vacuum and then separated by column chromatography (column chromatography conditions: stationary phase: 200-300 mesh silica gel powder, mobile phases: ethyl acetate (A) and petroleum ether (B), and mobile phase gradient procedure: A/B in volume ratio: 1:20), to obtain 0.0584 g of a reaction product.

The reaction product was characterized. $^1$H NMR (400 MHZ, deuterated chloroform) δ 7.38-7.36 (m, 2H), 7.27-7.25 (m, 3H), 7.22-7.21 (m, 3H), 7.17-7.15 (m, 2H), 6.11 (s, 1H), 3.78 (s, 3H), 3.69 (s, 3H), 2.96-2.92 (m, 1H), 2.89-2.84 (m, 1H), 2.64-2.59 (m, 1H), 2.32-2.27 (m, 1H), 2.16-2.10 (m, 1H), 2.05-1.97 (m, 2H) ppm. According to the characterization data, it can be seen that the obtained reaction product is pure dimethyl 3-phenyl-4-((phenylselenyl) methyl) cyclohex-2-ene-1,1-dicarboxylate (purity>95%). The yield of the product is calculated to be 66%.

From the above examples, it can be seen that in the presence of a free-radical initiator, a series of polysubstituted selenium-containing cyclopentene/cyclohexene compounds are constructed by tandem radical cyclization of an unsaturated selenide with a terminal alkyne. The synthesis method has simple operations, mild reaction conditions, broad substrate scope, excellent chemical selectivity and good atom economy.

The above-described embodiments are merely preferred embodiments for the purpose of fully illustrating the present invention, and the scope of the present invention is not limited thereto. Equivalent substitutions or modifications can be made by those skilled in the art based on the present invention, which are within the scope of the present invention as defined by the claims. The scope of the present invention is defined by the appended claims.

What is claimed is:

1. A polysubstituted selenium-containing cyclopent(hex)ene skeleton derivative, having a structural formula of:

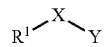

wherein X is selected from phenyl, naphthyl or heteroaryl;

R$^1$ is selected from hydrogen, C1-C4 alkyl, C1-C4 alkoxy, halo, amino, cyano, trifluoromethyl or nitro;

Y is selected from Formulas 1 to 6:

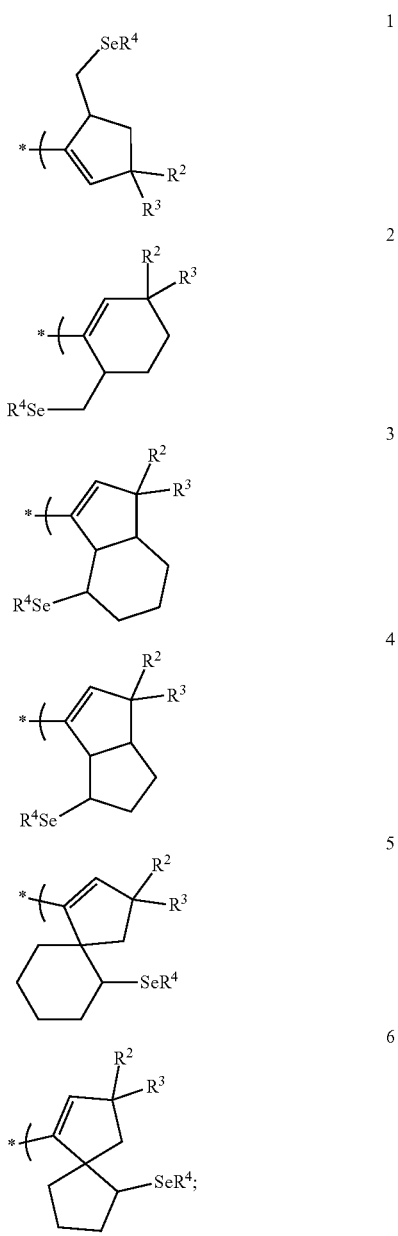

R$^2$ is selected from a methyl formate ester group, an ethyl formate ester group or cyano;

R$^3$ is selected from a methyl formate ester group, an ethyl formate ester group or cyano; and R⁴ is selected from phenyl, a substituted phenyl, or C1-C2 alkyl.

2. A method for synthesizing a polysubstituted selenium-containing cyclopent(hex)ene skeleton derivative according to claim 1, comprising steps of:

(1) under a protective atmosphere, adding an arylacetylene compound, an unsaturated selenide reagent and a free-radical initiator to an organic solvent, and stirring for reaction;

(2) after the reaction is completed, concentrating the reaction solution under vacuum, and separating by column chromatography to obtain the polysubstituted selenium-containing cyclopent(hex)ene skeleton derivative, wherein the reaction formula is shown as:

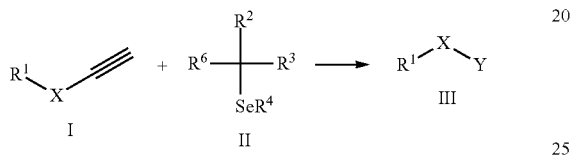

wherein R¹ is selected from hydrogen, C1-C4 alkyl, C1-C4 alkoxy, halo, amino, cyano, trifluoromethyl or nitro; R² is selected from a methyl formate ester group, an ethyl formate ester group or cyano; R³ is selected from a methyl formate ester group, an ethyl formate ester group or cyano; R⁴ is selected from phenyl, a substituted phenyl, or C1-C2 alkyl; R⁵ is selected from propenyl, butenyl, 2-cyclohexenyl, 2-cyclopentenyl, 1-methyl-1-cyclohexenyl or 1-methyl-1-cyclopentenyl; X is selected from phenyl, naphthyl or heteroaryl; and Y is selected from Formulas 1 to 6:

1

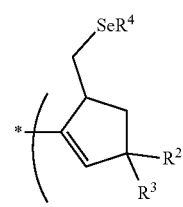

2

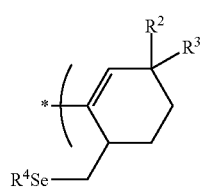

3

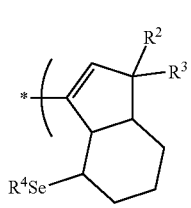

4

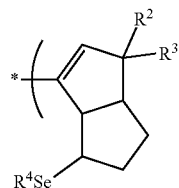

5

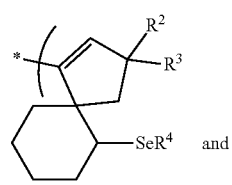

and

6

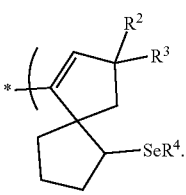

3. The method for synthesizing a polysubstituted selenium-containing cyclopent(hex)ene skeleton derivative according to claim 2, wherein in Step (1), the arylacetylene compound is selected from structural formulas (1) to (19):

(1)

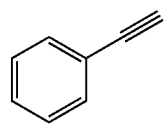

(2)

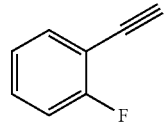

(3)

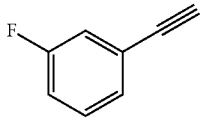

(4)

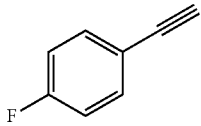

(5)

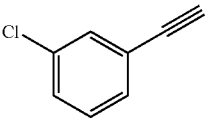

(6)

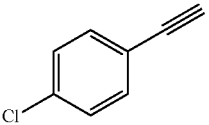

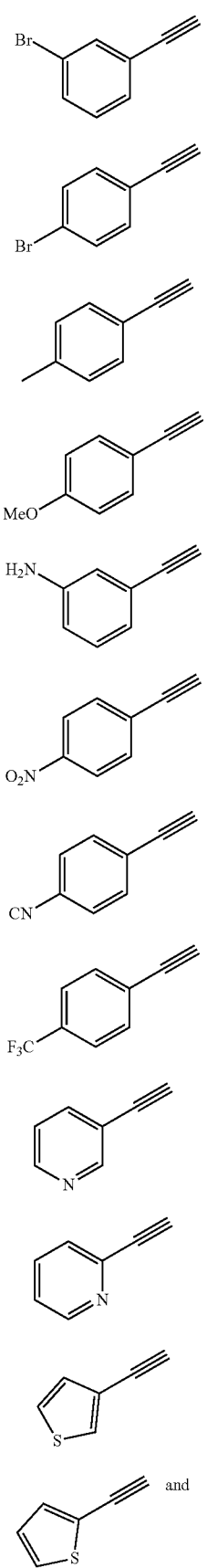
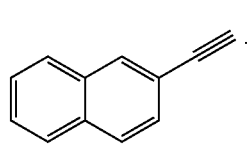
4. The method for synthesizing a polysubstituted selenium-containing cyclopent(hex)ene skeleton derivative according to claim 2, wherein in Step (1), the unsaturated selenide reagent is selected from structural formulas (20) to (34):
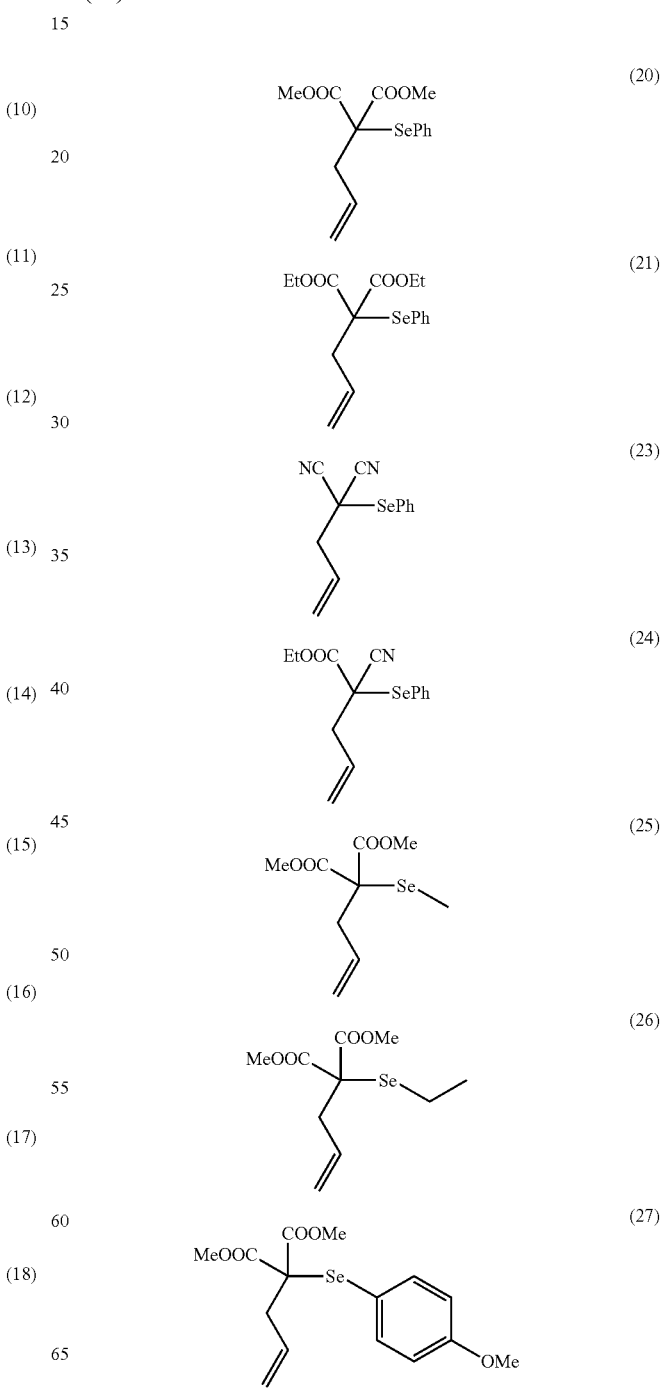

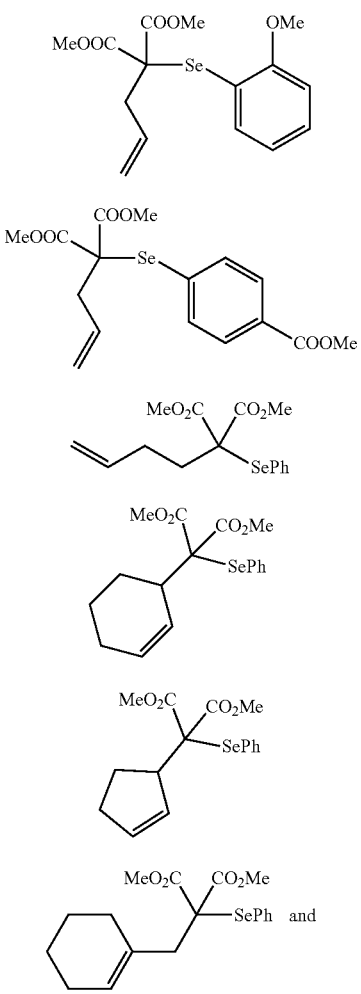

(28)

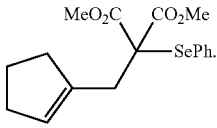

(29)

(30)

(31)

(32)

(33)

(34)

5. The method for synthesizing a polysubstituted selenium-containing cyclopent(hex)ene skeleton derivative according to claim 2, wherein in Step (1), the free-radical initiator is selected from the group consisting of azodiisobutyronitrile, azobisisoheptonitrile, dimethyl 2,2'-azobis(2-methylpropionate), N-iodo-succinimide, N-bromosuccinimide, benzoyl peroxide, and tert-butyl hydroperoxide.

6. The method for synthesizing a polysubstituted selenium-containing cyclopent(hex)ene skeleton derivative according to claim 2, wherein in Step (1), a molar ratio of the arylacetylene compound to the unsaturated selenide reagent is 1:3 to 3:1.

7. The method for synthesizing a polysubstituted selenium-containing cyclopent(hex)ene skeleton derivative according to claim 2, wherein in Step (1), the molar ratio of the arylacetylene compound to the free-radical initiator is 1:0.1 to 1:2.

8. The method for synthesizing a polysubstituted selenium-containing cyclopent(hex)ene skeleton derivative according to claim 2, wherein in Step (1), the organic solvent is selected from the group consisting of ethyl acetate, dimethyl sulfoxide, N,N-dimethylformamide, N,N-dimethylacetamide, 1,4-dioxane, acetonitrile and any combination thereof.

9. The method for synthesizing a polysubstituted selenium-containing cyclopent(hex)ene skeleton derivative according to claim 2, wherein in Step (1), the reaction temperature is 20 to 150° C.

10. The method for synthesizing a polysubstituted selenium-containing cyclopent(hex)ene skeleton derivative according to claim 2, wherein in Step (1), the reaction time is 2 to 12 hours.

\* \* \* \* \*